(12) United States Patent
Jeong et al.

(10) Patent No.: US 12,256,322 B2
(45) Date of Patent: Mar. 18, 2025

(54) DEVICE AND METHOD FOR SUPPORTING FEDERATED NETWORK SLICING AMONGST PLMN OPERATORS IN WIRELESS COMMUNICATION SYSTEM

(71) Applicant: Samsung Electronics Co., Ltd., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 17/758,297

(22) PCT Filed: Dec. 24, 2020

(86) PCT No.: PCT/KR2020/019064
§ 371 (c)(1),
(2) Date: Jun. 30, 2022

(87) PCT Pub. No.: WO2021/137526
PCT Pub. Date: Jul. 8, 2021

(65) Prior Publication Data
US 2023/0043081 A1 Feb. 9, 2023

(30) Foreign Application Priority Data
Jan. 3, 2020 (KR) .................. 10-2020-0000923

(51) Int. Cl.
*H04W 48/18* (2009.01)
*H04W 8/02* (2009.01)
(Continued)

(52) U.S. Cl.
CPC ............ *H04W 48/18* (2013.01); *H04W 8/02* (2013.01); *H04W 48/16* (2013.01); *H04W 60/00* (2013.01); *H04W 84/042* (2013.01)

(58) Field of Classification Search
None
See application file for complete search history.

(56) References Cited

U.S. PATENT DOCUMENTS

| 11,153,816 B2 | 10/2021 | Wang |
| 2012/0190361 A1 | 7/2012 | Shaikh et al. |
(Continued)

FOREIGN PATENT DOCUMENTS

| EP | 3404966 B1 | 5/2021 |
| KR | 10-2012-0085191 A | 7/2012 |
(Continued)

OTHER PUBLICATIONS

Supplementary European Search Report dated May 16, 2023, in connection with European Application No. 20909069.5, 10 pages.
(Continued)

*Primary Examiner* — Kenneth B Wells (57) ABSTRACT

The present disclosure relates to a 5th generation (5G) or pre-5G communication system for supporting a higher data transmission rate after a 4th generation (4G) communication system such as long-term evolution (LTE). According to various embodiments of the present disclosure, an operating method of a terminal in a wireless communication system provide a method including performing a registration procedure for a first public land mobile network (PLMN), receiving a downlink (DL) non-access-stratum (NAS) transport message including slice roaming information from an access and mobility management function (AMF) of the first PLMN, transmitting an uplink (UL) NAS transport message to the AMF, and performing a PLMN selection procedure using the slice roaming information.

12 Claims, 8 Drawing Sheets

(51) Int. Cl.
  *H04W 48/16* (2009.01)
  *H04W 60/00* (2009.01)
  *H04W 84/04* (2009.01)

(56) References Cited

U.S. PATENT DOCUMENTS

| | | | |
|---|---|---|---|
| 2019/0182655 A1 | 6/2019 | Gupta et al. | |
| 2021/0112513 A1 | 4/2021 | Chun | |
| 2021/0136675 A1 | 5/2021 | Lee et al. | |
| 2021/0160691 A1* | 5/2021 | Liu | H04W 8/18 |
| 2022/0132295 A1* | 4/2022 | Chen | H04W 80/04 |
| 2023/0052699 A1* | 2/2023 | Ninglekhu | H04W 60/04 |

FOREIGN PATENT DOCUMENTS

| | | |
|---|---|---|
| KR | 10-2019-0039260 A | 4/2019 |
| KR | 10-2021-0054963 A | 5/2021 |
| WO | 2018199611 A1 | 11/2018 |
| WO | 2019024816 A1 | 2/2019 |

OTHER PUBLICATIONS

International Search Report and Written Opinion of the International Searching Authority dated Apr. 15, 2021, in connection with International Application No. PCT/KR2020/019064, 9 pages.

3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019, 417 pages.

3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 2019, 558 pages.

* cited by examiner

DEVICE AND METHOD FOR SUPPORTING FEDERATED NETWORK SLICING AMONGST PLMN OPERATORS IN WIRELESS COMMUNICATION SYSTEM

CROSS-REFERENCE TO RELATED APPLICATIONS

This application is a 371 National Stage of International Application No. PCT/KR2020/019064, filed Dec. 24, 2020, which claims priority to Korean Patent Application No. 10-2020-0000923, filed Jan. 3, 2020, the disclosures of which are herein incorporated by reference in their entirety.

BACKGROUND

1. Field

The present disclosure generally relates to a wireless communication system, and more particularly, to an apparatus and a method for supporting slice federation between public land mobile network (PLMN) operators in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system includes beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

In addition, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The 5G communication system supports for various services compared to the existing 4G communication system. For example, the 5G communication system may support enhanced mobile broad band (eMBB), ultra-reliable and low latency communication (URLLC), massive machine type communication (mMTC), evolved multimedia broadcast/multicast service (eMBMS), and the like.

SUMMARY

Based on the discussions above, the present disclosure provides an apparatus and a method for supporting slice federation between public land mobile network (PLMN) operators in a wireless communication system.

According to various embodiments of the present disclosure, an operating method of a terminal is provided. The method includes performing a registration procedure for a first public land mobile network (PLMN), receiving a downlink (DL) non-access-stratum (NAS) transport message including slice roaming information from an access and mobility management function (AMF) of the first PLMN, transmitting an uplink (UL) NAS transport message to the AMF, and performing a PLMN selection procedure using the slice roaming information.

According to various embodiments of the present disclosure, a terminal in a wireless communication system is provided. The terminal includes at least one transceiver, and at least one processor, and the at least one processor is configured to perform a registration procedure for a first PLMN, receive a DL NAS transport message including slice roaming information from an AMF of the first PLMN, transmit a UL NAS transport message to the AMF, and perform a PLMN selection procedure using the slice roaming information.

An apparatus and a method according to various embodiments of the present disclosure may provide an apparatus and a method for supporting slice federation between public land mobile network (PLMN) operators in a wireless communication system.

Effects obtainable from the present disclosure are not limited to the above-mentioned effects, and other effects which are not mentioned may be clearly understood by those skilled in the art of the present disclosure from the following description.

DETAILED DESCRIPTION

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described hereafter. However, various embodiments of the present disclosure include technology which uses both hardware and software, and accordingly various embodiments of the present disclosure do not exclude a software-based approach.

Terms indicating signals, terms indicating channels, terms indicating control information, terms indicating network entities, and terms indicating components of a device used in the following explanation are illustrated for convenience of description. Accordingly, the present disclosure is not limited to the terms to be described, and other terms having the same technical meaning may be used.

In addition, the present disclosure describes various embodiments using terms used in some communication standard (e.g., 3rd generation partnership project (3GPP)), but this is only an example for description. Various embodiments of the present disclosure may be easily modified and applied in other communication systems.

Hereinafter, the present disclosure describes a technique for supporting slice federation between public land mobile network (PLMN) operators in a wireless communication system.

Network equipment evolves to a virtualized network function (NF—may be used interchangeably with a 'network element' in the following) by applying virtualization technology due to development of various information technology (IT), and the virtualized NFs may be implemented in software beyond physical restrictions to be installed/operated in various clouds or data centers (DCs). In particular, the NF may be freely scaled, installed or terminated according to service requirements, system capacity, and network load. Since such NFs, which are implemented in software, are basically driven on a physical configuration, for example, specific equipment, it should be noted that the physical configuration is not excluded. Also, the NFs may be implemented simply with a physical configuration, that is, in hardware.

A network slicing technology has been introduced to support various services in these various network structures. The network slicing is a technology which logically configures a network with a set of NFs for supporting a specific service, and separates it from other slices. One terminal may access two or more slices if receiving various services.

Figure 1:
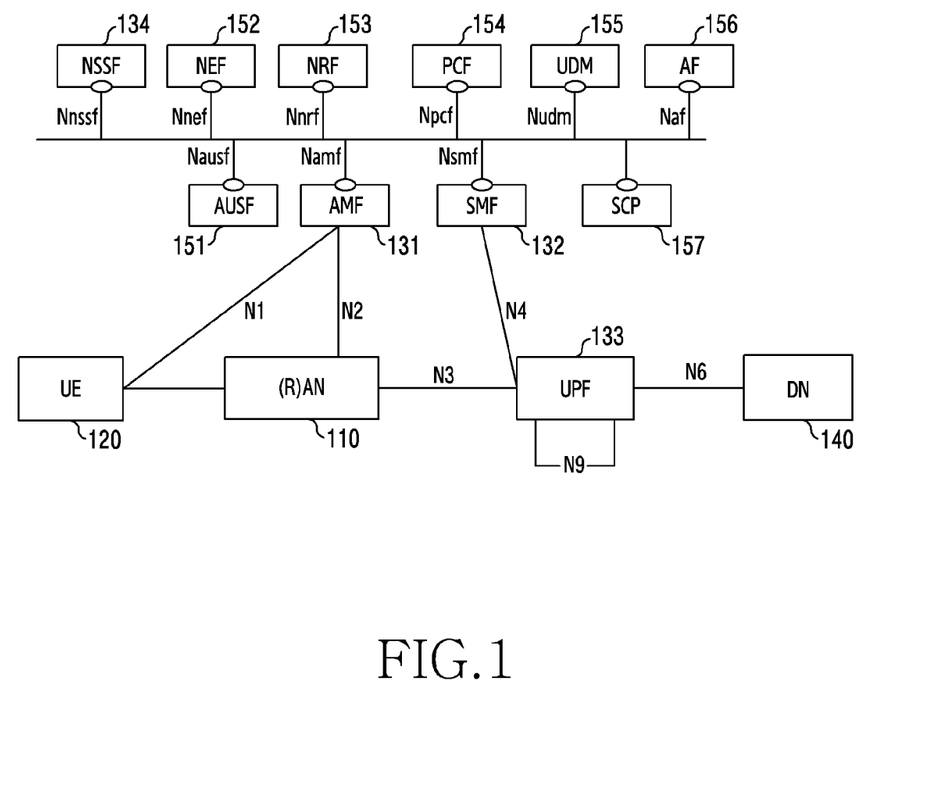
FIG. 1 illustrates a wireless communication system according to various embodiments of the present disclosure.

FIG. 1 illustrates a wireless communication system according to various embodiments of the present disclosure.

Referring to FIG. 1, a radio access node (RAN) 110 and a user equipment (UE) 120 are illustrated, as two of nodes using a radio channel in the wireless communication system. While FIG. 1 illustrates only one RAN 110 and one UE 120, other base stations identical or similar to the RAN station 110 may be further included. Also, FIG. 1 illustrates that only one UE 120 communicates within one RAN 110. However, it is apparent that a plurality of UEs may actually communicate within one RAN 110.

The RAN 110 is a network infrastructure for providing radio access to the UE 120. The RAN 110 has coverage defined as a specific geographic region based on a signal transmission distance (not shown in FIG. 1). Besides a base station, the RAN 110 may be referred to as an 'access point (AP)', an 'eNodeB (eNB)', a '5th generation (5G) node', a 'wireless point', and a 'transmission/reception point (TRP)' or other term having the equivalent technical meaning.

The UE 120 is a device used by a user, and communicates with the RAN 110 over a radio channel. In some cases, the UE 120 may be operated without user's involvement. For example, the UE 120 is a device which performs machine type communication (MTC), and is not necessarily carried by the user. The UE 120 shown in FIG. 1 may include at least one user portable device, and may include at least one MTC. The UE 120 of FIG. 1 may be referred to as a 'terminal', a 'mobile station', a 'subscriber station', a 'remote terminal', a 'wireless terminal', a 'UE' or a 'user device' or other term having the equivalent technical meaning.

An access and mobility management function (AMF) 131 may be a network entity which manages wireless network access and mobility for the UE 120. A session management function (SMF) 132 may be a network entity which manages connection of a packet data network for providing packet data to the UE 120. The connection between the UE 120 and the SMF 132 may be a packet data unit (PDU) session.

A user plane function (UPF) 133 may be a gateway for forwarding packets transmitted and received by the UE 120 or a network entity serving as the gateway. The UPF 133 may be connected to a data network (DN) 140 over an internet, and provide a path for data transmission/reception between the UE 120 and the DN 140. Hence, the UPF 133 may route data to be delivered over the internet among packets transmitted by the UE 120 to an internet data network.

A network slice selection function (NSSF) 134 may be a network entity which performs a network selection operation, for example, an operation of selecting a network slice described in the present disclosure. The operation of the NSSF 134 will be described in more detail in the drawings to be described.

An authentication server function (AUSF) 151 may be equipment (a network entity) which provides a service for processing subscriber authentication.

A network exposure function (NEF) 152 may be a network entity which may access information managing the UE 120 in the 5G network, subscribe to a mobility management event of the corresponding UE, subscribe to a session management event of a corresponding UE, request session related information, set charging information of the corresponding UE, request to change a PDU session policy for the corresponding UE, and transmit small data of the corresponding UE.

A network repository function (NRF) 153 may be a network entity (NF) which stores state information of NFs, and has a function of processing requests of other NFs for discovering an accessible NF.

A policy and charging function (PCF) 154 may be a network entity which applies a service policy, a charging policy, and a PDU session policy of a mobile communication operator for the UE 120.

A unified data management (UDM) 155 may be a network entity which stores information of a subscriber and/or the UE 120.

An application function (AF) 156 may be an NF having a function for providing a service to users by interoperating with a mobile communication network.

A service communication proxy (SCP) 157 is an NF which provides functions such as NF discovery for communication between NFs, and message transfer between NFs. The SCP 157 may operate in an integrated form with the NRF 153 according to an operator's selection, wherein the SCP 157 may include the functions of the NRF 153, or, conversely, the NRF 153 may be included as a function of the SCP 157.

Hereinafter, for convenience of description, subjects which exchange information for the access control and the state management shall be described collectively as NFs. The NF may be, for example, at least one of the AMF 131, the SMF 132, or the NSSF 134. However, the embodiments of the present invention may be equally applied even if the NF is actually implemented as an instance (an AMF instance, an SMF instance, an NSSF instance, etc.).

In various embodiments of the present disclosure, the instance may indicate a state in which a specific NF exists in the form of software code, and a physical computing system, for example, a specific computing system existing on a core network is allocated and executes physical and/or logical resources from a computing system to perform the NF function. Accordingly, the AMF instance, the SMF instance, and the NSSF instance may indicate using the physical and/or logical resources allocated for the AMF, SMF, and NSSF operations respectively from the specific computing system existing on the core network. As a result, the presence of the physical AMF, SMF, and NSSF devices and the AMF instance, the SMF instance, and the NSSF instance using the physical and/or logical resources allocated for the AMF, SMF, and NSSF operations from the specific computing system existing on the core network may perform the same operation. Hence, various embodiments of the present disclosure may be applied by replacing details described with the NF (the AMF, the SMF, the UPF, the NSSF, the NRF, the SCP, etc.) with the NF instance, or, conversely, replacing details described with the NF instance with the individual NF. Likewise, various embodiments of the present disclosure may be applied by replacing details described with a network (NW) slice with a NW slice instance, or conversely, replacing details described with the NW slice instance with the NW slice.

The 3GPP system defines conceptual links for interconnecting NFs in the 5G system as reference points. The following illustrates the reference points included in the 5G system architecture represented in FIG. 1.

Figure 2:
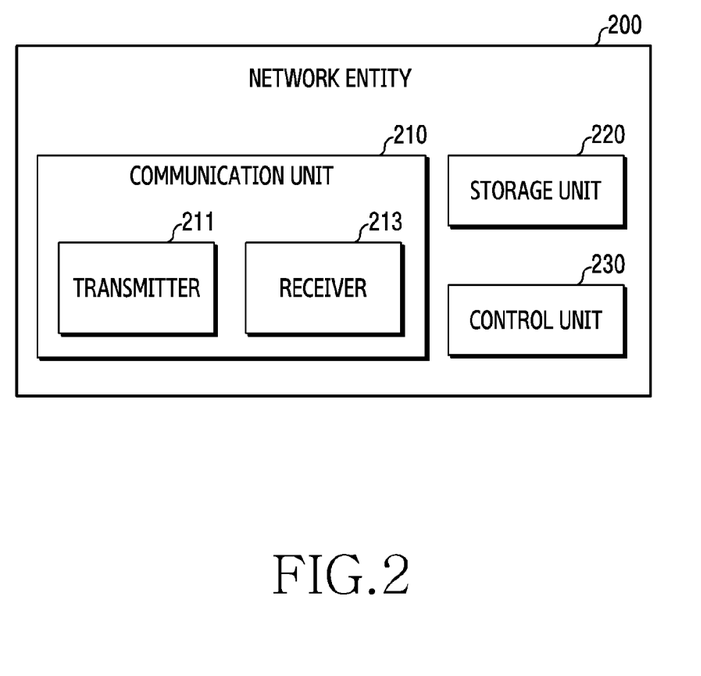
FIG. 2 illustrates a configuration of a network entity in a wireless communication system according to various embodiments of the present disclosure.

N1: a reference point between the UE and the AMF
N2: a reference point between the (R)AN and the AMF
N3: a reference point between the (R)AN and the UPF
N4: a reference point between the SMF and the UPF
N5: a reference point between the PCF and the AF
N6: a reference point between the UPF and the DN
N7: a reference point between the SMF and the PCF
N8: a reference point between the UDM and the AMF
N9: a reference point between two core UPFs
N10: a reference point between the UDM and the SMF
N11: a reference point between the AMF and the SMF
N12: a reference point between the AMF and the AUSF
N13: a reference point between the UDM and the AUSF
N14: a reference point between two AMFs N15: a reference point between the PCF and the AMF in a non-roaming scenario, and a reference point between the PCF and the AMF in a visited network in a roaming scenario FIG. 2 illustrates a configuration of a network entity in a wireless communication system according to various embodiments of the present disclosure. The network entity of the present disclosure is a concept including the NF according to system implementation. A term such as 'unit' or '~er' used hereafter indicates a unit for processing at least one function or operation, and may be implemented using hardware, software, or a combination of hardware and software.

The network entity according to various embodiments of the present disclosure may include a communication unit 210, a storage unit 220, and a control unit 230 for controlling general operations of the network entity 200.

The communication unit 210 transmits and receives signals with other network entities. Accordingly, whole or part of the communication unit 210 may be referred to as a transmitter 211, a receiver 213, or at least one transceiver/transceiver 210.

The storage unit 220 stores data such as a basic program, an application program, and setting information for the operation of the network entity 200. The storage unit 220 may include a volatile memory, a non-volatile memory, or a combination of a volatile memory and a non-volatile memory. In addition, the storage unit 220 provides the stored data at a request of the control unit 230.

The control unit 230 controls the general operations of the network entity 200. For example, the control unit 230 transmits and receives signals through the communication unit 210. In addition, the control unit 230 records and reads data in the storage unit 220. The control unit 230 may perform functions of a protocol stack required by a communication standard. For doing so, the control unit 230 may include a circuit, an application-specific circuit, at least one processor or a micro-processor, or may be a part of a processor. Also, part of the communication unit 210 and the control unit 230 may be referred to as a communication processor (CP). The control unit 230 may control the network entity 200 to perform any one operation of the various embodiments of the present disclosure.

It is noted that the communication unit 210 and the control unit 230 are not implemented necessarily as separate modules, and may be implemented as a single component in the form of a single chip or a software block. The communication unit 210, the storage unit 220, and the control unit 230 may be electrically connected. In addition, the operations of the network entity 200 may be realized by including the storage unit 220 which stores corresponding program code in the network entity 200.

The network entity 200 includes a network node, and may be any one of a RAN, a UE, an NF, an AMF, an SMF, a UPF, an NEF, an NRF, a CF, an NSSF, a UDM, an AF, an AUSF, an SCP, a UDSF, a context storage, an operations-administration-management (OAM), an element management system (EMS), a configuration server, and an ID management server.

The 5G system according to various embodiments of the present disclosure may include a terminal, a base station, and a 5G core network. The 5G core network may include network functions (NFs) such as AMF, SMF, PCF, UPF, UDM, UDR, NEF, NSSF, NRF, and SCP. According to various embodiments of the present disclosure, the NF may indicate the NE or the network resource. A next generation-radio access network (NG-RAN), a 5G-RAN, or a RAN indicate a base station which provides a wireless communication function to the terminal. The UE may access the 5G core network through the base station.

In addition, various NFs described below may be configured with one specific physical device or two or more physical devices. In addition, the physical devices each may include a program, or software for executing the methods described below under control of a processor included therein. The following description presents only names for the NFs respectively for convenience of explanation, but it is apparent to those skilled in the art that they are implemented as physical devices including at least one processor as above, and are equipped with a program or software for the operations explained in the present disclosure. Accordingly, the expression 'device' shall be omitted in the following, and only a specific NF name will be described.

Figure 3:
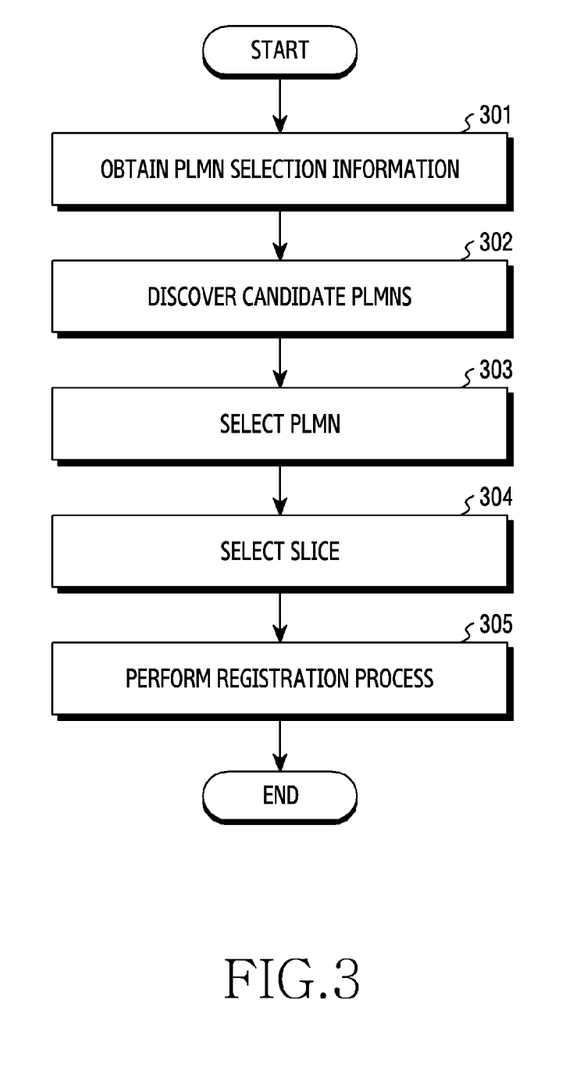
FIG. 3 illustrates an operation process of a terminal in a wireless communication system according to various embodiments of the present disclosure.

FIG. 3 illustrates an operation process of a terminal in a wireless communication system according to various embodiments of the present disclosure.

The embodiment of FIG. 3 includes a process of selecting a public land mobile network (PLMN) for registering and operating the terminal, and selecting a slice. The embodiment of FIG. 3 assumes a condition for the PLMN selection, for example, occurrence of a situation where power on and airplane mode off of the terminal are satisfied, and the PLMN selection is required.

Referring to FIG. 3, in step 301, the terminal obtains information for the PLMN selection. The information for the PLMN selection may be pre-stored in the terminal, received from a home PLMN (HPLMN), or delivered to the terminal in another separate manner.

In step 302, the terminal discovers PLMN candidates accessible at a current location for the PLMN selection. This may be implemented by repeating scanning a frequency band accessible by the terminal, receiving system information broadcast by a base station of an operator in a corresponding band, and detecting a PLMN identifier (ID) included therein.

In step 303, the terminal selects at least one PLMN from among the candidate PLMNs. In addition, the terminal selects a PLMN ID of at least one selected PLMN. At this time, the terminal may select the HPLMN first of all, first select a registered PLMN (RPLMN), or select the PLMN of the highest priority among the discovered candidate PLMNs using the aforementioned PLMN selection information (in general, a priority list per PLMN ID).

In step 304, the terminal may select a slice to request in a registration process using, if any, information available for the slice selection with respect to the selected PLMN, for example, configured network slice selection assistance information (NSSAI) or allowed NSSAI and otherwise using default configured NSSAI.

In step 305, the terminal performs the registration process with the selected PLMN. In addition, if there is the selected slice information, the terminal includes and transmits it in requested NSSAI of a registration request message.

The process described in the embodiment of FIG. 3 is based on the process of first selecting the PLMN using the information possessed by the terminal and then selecting the slice to use. However, in some cases, there may exist a basic roaming agreement for a specific subscriber between the HPLMN and a visited PLMN (VPLMN)), but there may be no roaming agreement for the specific slice to be used by the terminal. In this case, since the terminal does not consider the slice information in the PLMN selection, an optimal slice may not be used for the terminal or the registration itself may fail. To address these, the operation process of the terminal according to other embodiments of the present disclosure may include a process where the terminal receives the slice information according to the roaming agreement, and the terminal selects the PLMN having the roaming agreement for the slice to use first by considering the slice information with the roaming agreement in the PLMN selection process.

Figure 4:
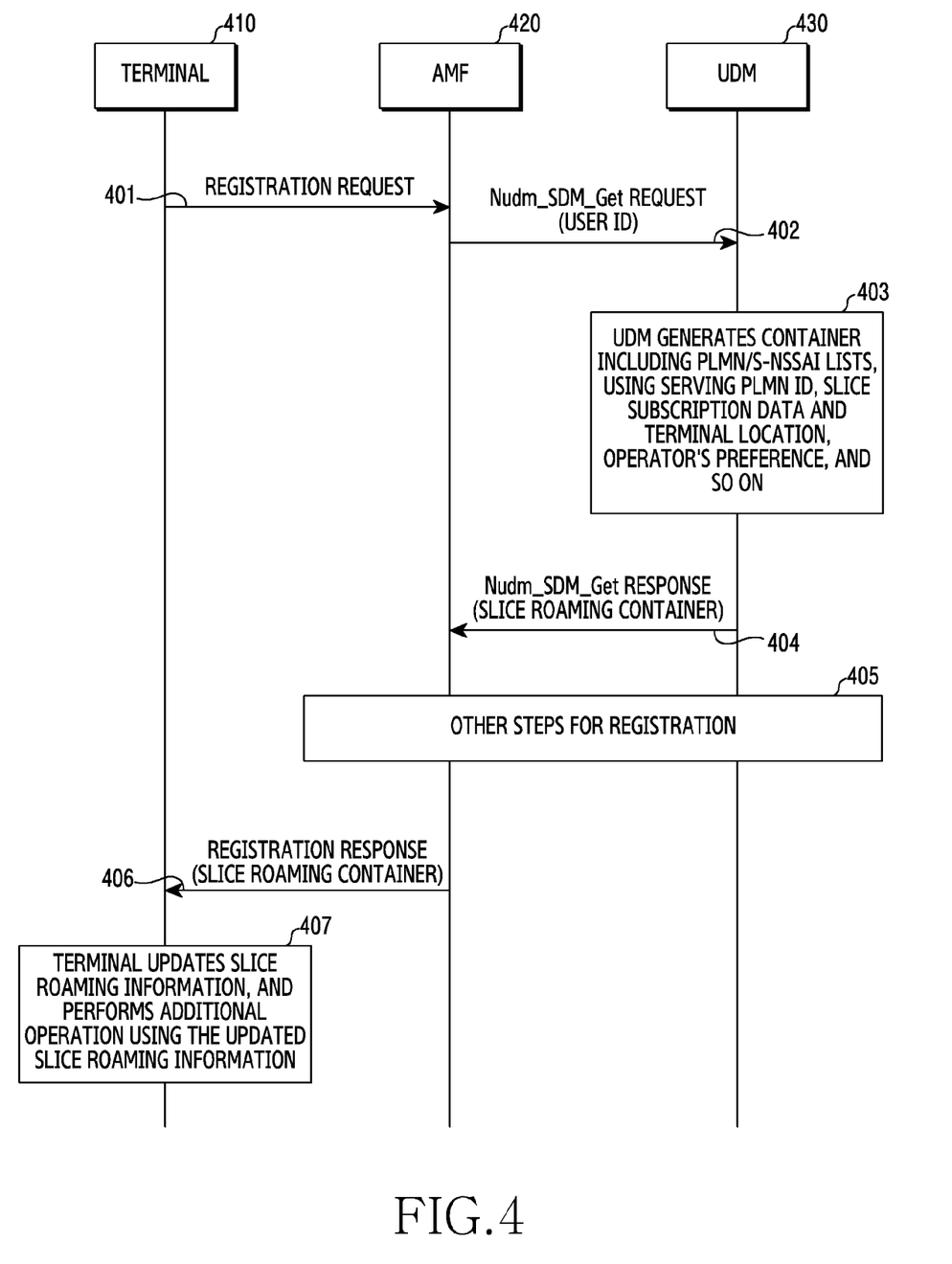
FIG. 4 illustrates a process of delivering slice roaming information to a terminal in a wireless communication system according to various embodiments of the present disclosure.

FIG. 4 illustrates a process of delivering slice roaming information to a terminal in a wireless communication system according to various embodiments of the present disclosure.

An AMF 420 and a UDM 430 of FIG. 4 may be NFs of the HPLMN or NFs of the VPLMN. The PLMN may be at least one of the HPLMN or the VPLMN, and each network entity may be applied according to the PLMN.

Referring to FIG. 4, in step 401, a terminal 410 performs a registration procedure. The terminal 410 transmits a registration request message to the AMF 420. The PLMN for the registration may be at least one of the HPLMN or the VPLMN.

In step 402, the AMF 420 processes the registration request of the terminal, and transmits a request message for receiving subscription information from the UDM 430 to the UDM 430. At this time, the information requested by the AMF 420 to the UDM 430 may include slice roaming information. The request message may be a Nudm_SDM_Get request message, and includes an ID of the terminal (subscriber) 410. If UE context of the AMF 420 includes information that the AMF 420 should receive the slice roaming information, the AMF 420 may explicitly notify the UDM 430 of the slice roaming information request. The slice roaming information may be configured as separate information or may be included in steering of roaming (SoR).

In step 403, the UDM 430 generates and includes a response containing the subscription information of the terminal (subscriber) 410, particularly in this embodiment, information for supporting the slice roaming for the subscriber 410 in a slice roaming container according to the request of the AMF 420. The corresponding slice roaming container may include a list of PLMN IDs to be accessed by the terminal 410 (listed in priority), and a list of slice IDs (S-NSSAI) roaming agreed in each PLMN ID. A specific configuration of the corresponding slice roaming container shall be described in a separate embodiment. In this process, the UDM 430 may perform a query and response process for receiving information from an NF containing separate subscription information or slice roaming information, for example, a unified data repository (UDR). The slice roaming information may be configured as separate information or may be included in the SoR.

In step 403, the PLMN ID to be included by the UDM 430 in the list may be selected using information received from the AMF 420 (a country code currently selected by the terminal 410 or included in a serving PLMN ID or the PLMN ID of the AMF 420, or location information of the terminal 410) or preset information. For example, using the country code of the serving PLMN ID received from the AMF 420, the slice roaming information may be generated based on the PLMN ID accessible in the country where the terminal 410 is currently located, or the PLMN ID of a neighboring country. Alternatively, the UDM 430 may generate the slice roaming information based on the roaming service information requested by the subscriber (if the roaming service is requested in advance), the PLMN ID accessible by the subscriber in a country to travel, and the PLMN ID of the neighboring country.

In step 404, the UDM 430 responds to the AMF 420 with the subscription information of the terminal (subscriber) 410, wherein the message used at this time may be a Nudm_SDM_Get response message, and the response message includes the container including the PLMN ID and the slice ID list.

In step 405, other steps for the registration may be performed.

In step 406, the AMF 420 transmits a registration response message to the terminal 410, and this message includes the container received by the AMF 420 in step 404.

In step 407, the terminal 410 stores the slice roaming or the SoR container received from the AMF 420. In addition, the terminal 410 updates the slice roaming information including the list for the PLMN selection by using the information included in the container. Also, the terminal 410 may perform an additional operation using the updated slice roaming information. For example, the terminal 410 may perform the PLMN selection using the updated slice roaming information.

Figure 5:
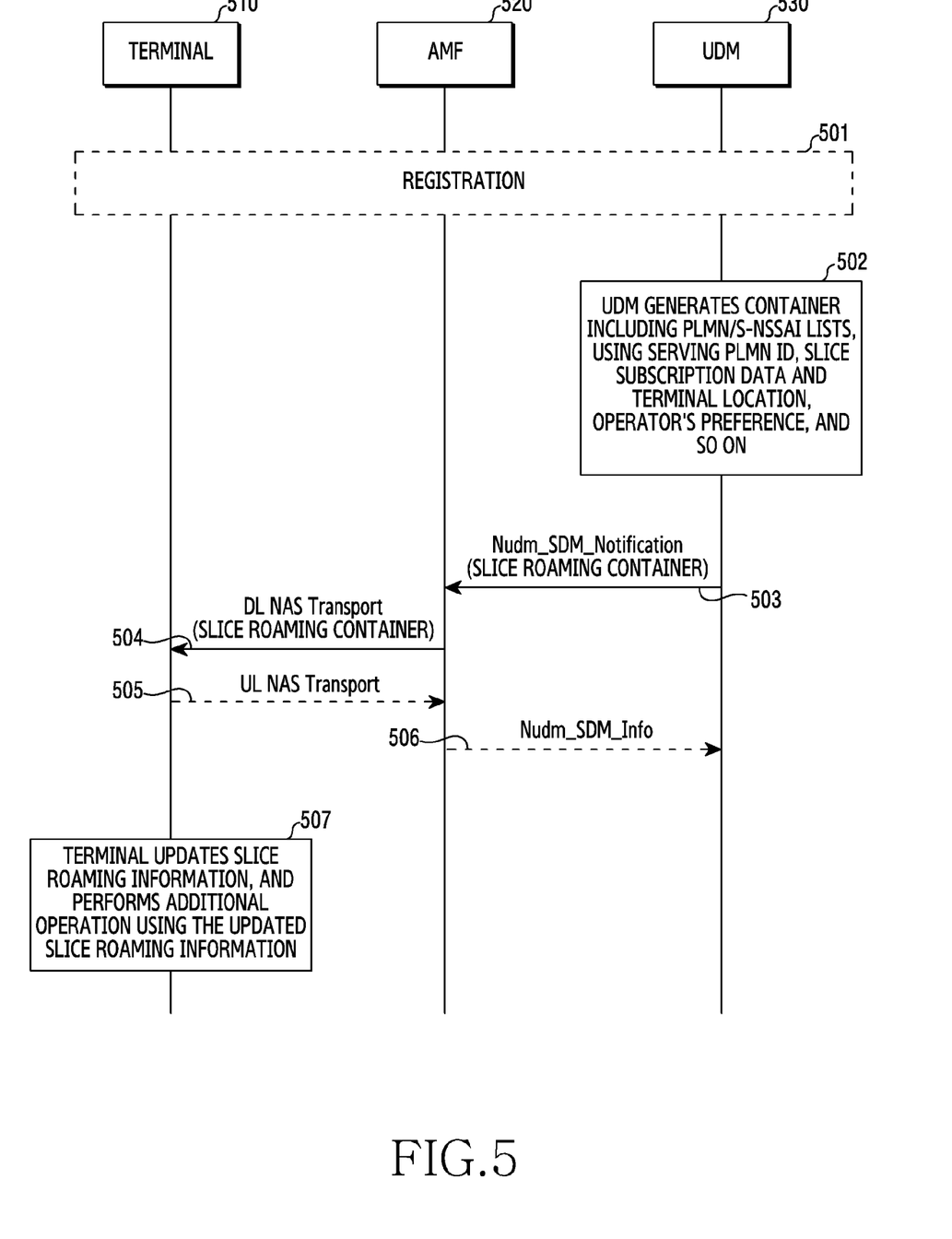
FIG. 5 illustrates a process of delivering slice roaming information to a terminal in a wireless communication system according to various embodiments of the present disclosure.

FIG. 5 illustrates a process of delivering slice roaming information to a terminal in a wireless communication system according to various embodiments of the present disclosure.

Specifically, FIG. 5 shows the process in which after a registration procedure 501 of a terminal 510 is completed, an AMF 520 forwards slice roaming information to the terminal 510 using a separate message.

The AMF 520 and a UDM 530 of FIG. 5 may be NFs of the HPLMN or NFs of the VPLMN. The PLMN may be at least one of the HPLMN or the VPLMN, and each network entity may be applied according to the PLMN.

Referring to FIG. 5, in step 501, the terminal 510 is registered at a specific PLMN.

In step 502, the UDM 530 includes and generates information for supporting the slice roaming in the slice roaming container. The corresponding slice roaming container may include a list of PLMN IDs to be accessed by the terminal 510 and a list of slice IDs (S-NSSAI) roaming-agreed in each PLMN ID. The list of the PLMN IDs to be accessed by the terminal 510 may be contained in the slice roaming container based on the priority. A specific configuration of the corresponding slice roaming container will be described in a separate embodiment. During the process of step 502, the UDM 530 may perform a query response process for receiving information from the NF containing the separate subscription information or the slice roaming information, for example, the UDR. The slice roaming information may be configured as separate information or may be included in the SoR.

In step 502, the PLMN ID to be included by the UDM 530 in the list may be selected using information pre-received from the AMF 520 which serves the terminal 510 (a country code included in the serving PLMN ID or the PLMN ID of the AMF 520, or location information stored of the terminal 510), or preset information. For example, using the country code of the serving PLMN ID received from the AMF 520, the slice roaming information may be generated based on the PLMN ID accessible in the country where the terminal 410 is currently located, or a PLMN ID of a neighboring country. Alternatively, the UDM 430 may generate the slice roaming information based on the roaming service information requested by the subscriber 510 (if the roaming service is requested in advance), the PLMN ID accessible by the subscriber 510 in a country to travel, and the PLMN ID of the neighboring country.

In step 503, the UDM 530 performs notification for forwarding the slice roaming information of the terminal (subscriber) 510 to the AMF 520. At this time, the notification message used may be an Ndum_SDM_Notification message. According to an embodiment, the Ndum_SDM_Notification message may include the slice roaming container including the PLMN ID and the slice ID list.

In step 504, the AMF 520 receiving the notification message from the UDM 530 transmits a downlink (DL) non-access-stratum (NAS) transport message including the received slice roaming container to the terminal 510.

In step 505, the terminal 510 may transmit an acknowledgment (ACK) for the received DL NAS transmission message. Specifically, the terminal 510 may transmit an uplink (UL) NAS transport message to the AMF 520.

In step 506, the AMF 520 may transmit a notification result to the UDM 530. Specifically, the AMF 520 may transmit a Nudm_SDM_info message to the UDM 530.

In step 507, the terminal 510 stores the slice roaming or the SoR container received from the AMF 520. In addition, the terminal 510 updates the slice roaming information including the list for the PLMN selection by using the information included in the container. Also, the terminal 510 may perform an additional operation using the updated slice roaming information. For example, the terminal 510 may perform the PLMN selection using the updated slice roaming information.

In various embodiments of the present disclosure, a method of configuring and transferring slice roaming information to a terminal is as follows.

a first method: using a transparent container for slice roaming; or a second method: including slice roaming information in a SoR container In the first method, information indicating that a container type is the transparent container including the information for the slice roaming may be included in the delivery from the UDM to the AMF and from the AMF to the terminal.

The following [Table 1] shows an example of a configuration of the transparent container. Referring to [Table 1], the container may be expressed as a list of one or more slice IDs (S-NSSAI or slice ID of other type) for supporting the roaming per PLMN ID. The priority increases as approaching 1.

TABLE 1

| PLMN ID 1 |
| Slice identifier 1 |
| ... |
| PLMN ID n |
| Slice identifier n |

The following [Table 2] shows another example of the configuration of the transparent container. Referring to [Table 2], the container may be expressed as a list indicating only whether the slice roaming is supported per PLMN ID. The priority increases from 1 to n.

TABLE 2

| PLMN ID 1 |
| Slice roaming supported indicator |
| ... |
| PLMN ID n |
| Slice roaming supported indicator |

In [Table 1] or [Table 2], the information delivered through the transparent container may be delivered using the SoR container rather than a separate container for the slice roaming. If the SoR container needs to include an access technology ID list for each PLMN ID, pieces of two information (i.e., the access technology ID list per PLMN ID and the slice ID list with the roaming agreed per PLMN ID) may be included in separate SoR containers, or may be included in one SoR container.

The following [Table 3] shows an example of the configuration of the SoR container. Referring to [Table 3], the access technology ID per PLMN ID and the slice ID or the slice roaming indicator are delivered together through the SoR container.

TABLE 3

PLMN ID 1
access technology identifier 1
Slice roaming support indicator or supported slice ID 1
. . .
PLMN ID n
access technology identifier n
Slice roaming support indicator or supported slice ID n Yet another method is to use two SoR containers, by separating the SoR container which contains the access technology ID per PLMN ID and the SoR container which contains the slice information.

Meanwhile, a header of an information element (IE) containing the SoR or the slice roaming information may include information indicating the type of the current container (i.e., whether the current container is the SoR, the slice roaming, the ACK, etc.), and information indicating the type of the list included in the actual container, that is, a secured packet, the PLMN ID and the access technology ID, the PLMN ID and the slice roaming support indicator, the PLMN ID and the slice identifier supporting the roaming, or whether the PLMN ID, the access technology ID, and the slice roaming information are included.

The above-mentioned [Table 1] through [Table 3] are merely examples of the configuration of the transparent container or the SoR container. The configuration of the transparent container or the SoR container according to various embodiments of the present disclosure is not limited to the configurations of [Table 1] through [Table 3], and it is apparent that an additional configuration in addition to the configurations of [Table 1] through [Table 3] described above may be included in the transparent container or the SoR container.

Hereinafter, in FIG. 6 through FIG. 8, various embodiments of the present disclosure suggest a method for changing a PLMN selection operation of a terminal.

Figure 6:
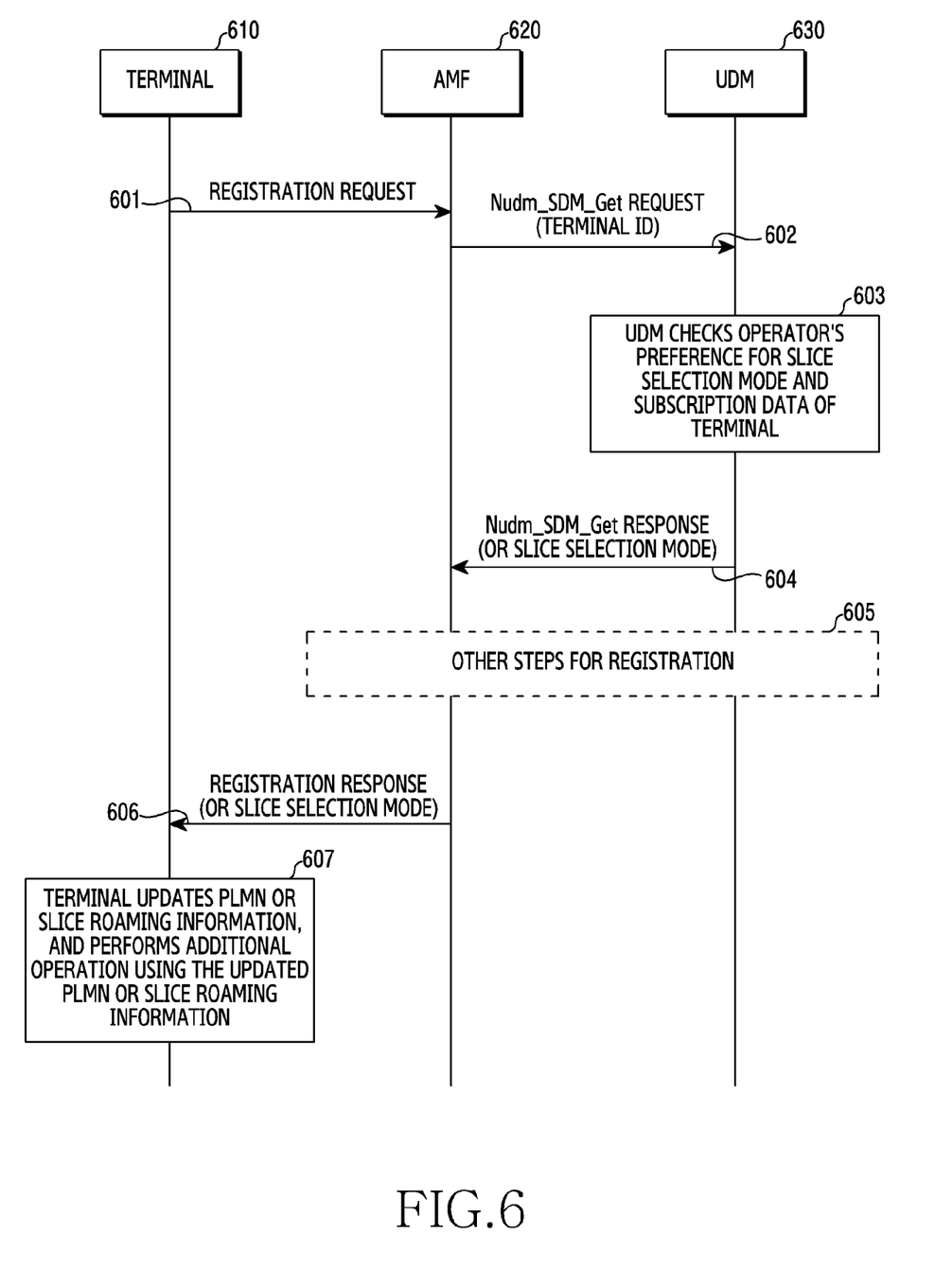
FIG. 6 illustrates a process of delivering a priority of a public land mobile network (PLMN) selection operation to a terminal in a wireless communication system according to various embodiments of the present disclosure.

FIG. 6 illustrates a process of delivering a priority for a PLMN selection operation to a terminal in a wireless communication system according to various embodiments of the present disclosure.

An AMF 620 and a UDM 630 of FIG. 6 may be NFs of the HPLMN or NFs of the VPLMN. The PLMN may be at least one of the HPLMN or the VPLMN, and each network entity may be applied according to the PLMN.

Referring to FIG. 6, in step 601, a terminal 610 transmits a registration request message to the AMF 620.

In step 602, the AMF 620 requests subscription information from the UDM 630 in registration processing. Specifically, it transmits a Nudm_SDM_Get request message to the AMF 620. The Nudm_SDM_Get request message may include an ID of the terminal 610.

In step 603, the UDM 630 determines to forward information for setting or changing a PLMN selection mode of the terminal 610, by considering subscription information of the terminal (subscriber) 610, the PLMN currently accessed by the terminal 610, and operator settings. The PLMN selection mode is information which notifies a preferred scheme among the existing PLMN selection operating regardless of the slice roaming, or the PLMN selection scheme considering whether the slice roaming is performed. If the information of the PLMN selection mode is absent, the existing PLMN selection is applied. According to an embodiment, the UDM 630 checks a preference of an operator (a PLMN operator) for the slice selection mode and subscription data of the terminal.

In step 604, the UDM 630 forwards the information of the PLMN selection mode to the AMF 620. Specifically, the UDM 630 transmits a Nudm_SDM_Get response message to the AMF 620. The Nudm_SDM_Get response message may include the PLMN or the slice selection mode.

In step 605, the UDM 630 may perform operations of other steps for the registration.

In step 606, the AMF 620 forwards the PLMN selection mode to the terminal 610 through a response message to the registration. Specifically, the AMF 620 transmits a registration response message to the terminal 610. The registration response message may include the PLMN or the slice selection mode.

In step 607, the terminal 610 stores the PLMN selection mode set by the HPLMN received from the AMF 620. In addition, the terminal 610 updates the PLMN or the slice selection mode. Also, the terminal 610 may perform an additional operation using the updated PLMN or slice selection mode. For example, the terminal 610 may perform a PLMN selection operation using the updated PLMN or slice selection mode.

Figure 7:
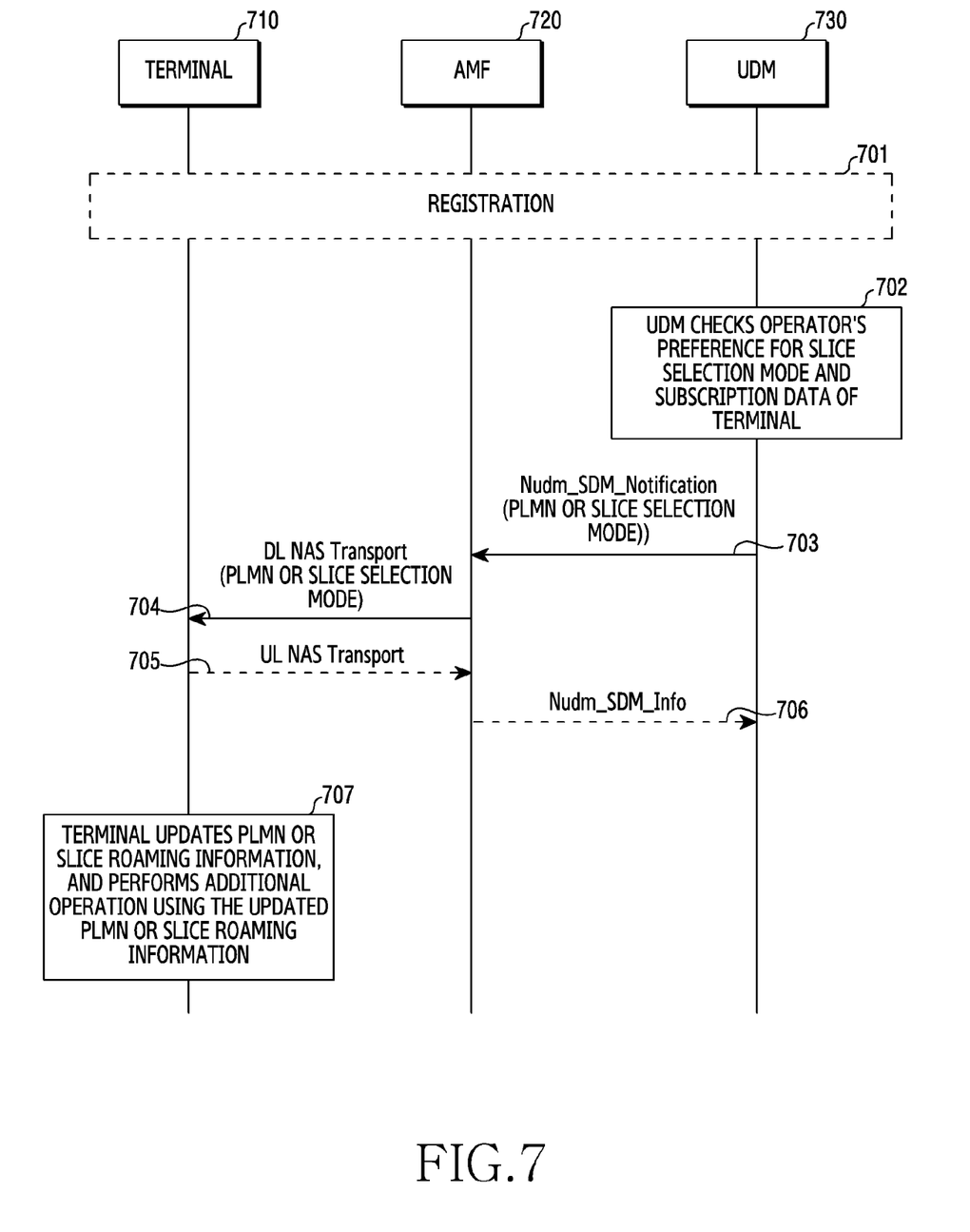
FIG. 7 illustrates a process of delivering a priority of a PLMN selection operation to a terminal in a wireless communication system according to various embodiments of the present disclosure.

FIG. 7 illustrates a process of delivering a priority for a PLMN selection operation to a terminal in a wireless communication system according to various embodiments of the present disclosure.

An AMF 720 and a UDM 730 of FIG. 7 may be NFs of the HPLMN or NFs of the VPLMN. The PLMN may be at least one of the HPLMN or the VPLMN, and each network entity may be applied according to the PLMN.

Referring to FIG. 7, in step 701, a terminal 710 is registered at a specific PLMN.

In step 702, the UDM 730 determines to forward information for setting or changing a PLMN selection mode of the terminal 710, by considering subscription information of the terminal (subscriber) 710, the PLMN currently accessed by the terminal 710, and operator settings. The PLMN selection mode is information indicating a preferred scheme among the existing PLMN selection which operates regardless of the slice roaming, or the PLMN selection scheme considering whether the slice roaming is performed. If the information of the PLMN selection mode is absent, the existing PLMN selection is applied. According to an embodiment, the UDM 730 checks a preference of an operator (a PLMN operator) for the slice selection mode and subscription data of the terminal.

In step 703, the UDM 730 forwards information of the PLMN selection mode to the AMF 720. Specifically, the UDM 730 transmits a Nudm_SDM_Notification message to the AMF 720. The Nudm_SDM_Notification message may include the PLMN or the slice selection mode.

In step 704, the AMF 720 forwards the PLMN selection mode to the terminal 704 using a DL NAS transport message. The DL NAS transport message may include the PLMN or the slice selection mode.

In step 705, the terminal 710 may forward an ACK to the received mode information using a UL NAS transport message.

In step 706, the AMF 720 may notify the UDM 730 of the HPLMN that the received information has been forwarded to the terminal 710. Specifically, the AMF 720 transmits a Nudm_SDM_Info message to the UDM 730.

In step 707, the terminal 710 stores the PLMN selection mode set by the HPLMN received from the AMF 720. In addition, the terminal 710 updates the PLMN or the slice selection mode. Also, the terminal 710 may perform an additional operation using the updated PLMN or slice selection mode. For example, the terminal 710 may perform a PLMN selection operation using the updated PLMN or slice selection mode.

Figure 8:
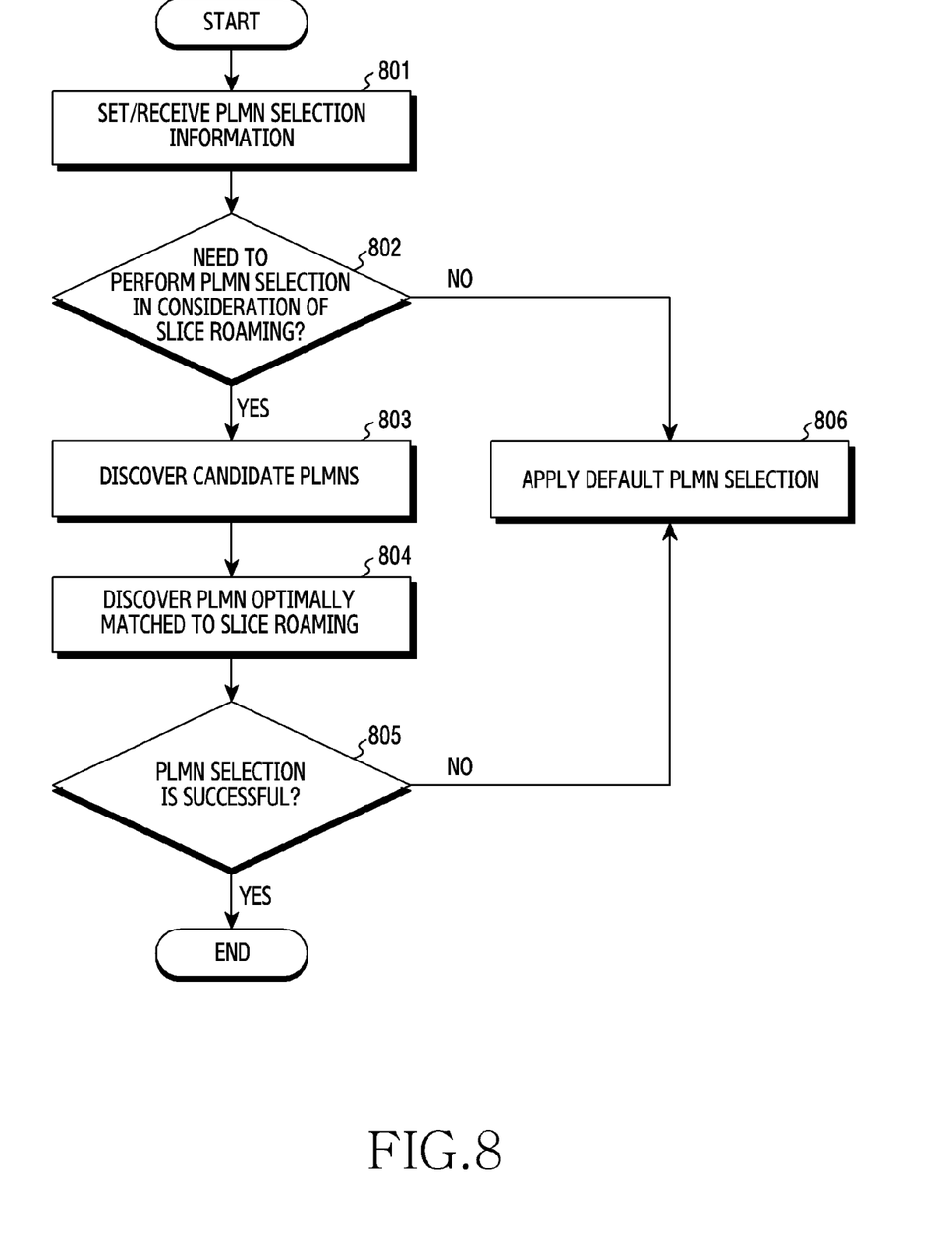
FIG. 8 illustrates a process of a terminal for selecting a PLMN or a process for selecting a PLMN in consideration of slice roaming in a wireless communication system according to various embodiments of the present disclosure.

FIG. 8 illustrates a process of a terminal for selecting a PLMN or a process for selecting a PLMN in consideration of slice roaming in a wireless communication system according to various embodiments of the present disclosure.

Referring to FIG. 8, in step 801, the terminal obtains information for performing PLMN selection. The terminal may receive the information for performing the PLMN selection from the network. Alternatively, the information for performing the PLMN selection may be preset in the terminal. Alternatively, the information for performing the PLMN selection may be information received and stored in advance from the network through various embodiments of the present invention. According to various embodiments of the present disclosure, the information for performing the PLMN selection may be a container or a SoR container which contains a priority list of PLMN IDs or a PLMN ID list including roaming support slice information.

In step 802, the terminal determines whether it is necessary to perform the PLMN selection in consideration of the slice roaming based on the information for performing the PLMN selection obtained in step 801. If it is determined that it is necessary to perform the PLMN selection in consideration of the slice roaming, the terminal proceeds to step 803. If it is determined that it is not necessary to perform the PLMN selection in consideration of the slice roaming, the terminal proceeds to step 806.

According to various embodiments of the present disclosure, whether it is necessary to perform the PLMN selection in consideration of the slice roaming may be determined based on whether the terminal has the information for PLMN selection considering the slice roaming. Alternatively, according to various embodiments of the present disclosure, whether it is necessary to perform the PLMN selection in consideration of the slice roaming may be determined based on whether the terminal explicitly receives from the network a message that the PLMN selection mode precedes the PLMN selection considering the slice roaming in addition to the information for the PLMN selection in consideration of the slice roaming.

In step 803, the terminal scans for a PLMN accessible at a current location, and discovers candidate PLMNs.

In step 804, the terminal selects a PLMN/PLMN ID of the highest priority among PLMNs for supporting the slice roaming. Specifically, the terminal discovers the PLMN optimally matched to the slice roaming. The operation of step 804 may be performed using a priority list of PLMN/PLMN IDs in consideration of the slice roaming obtained by the terminal in advance. At this time, if the terminal may use two or more network slices, it may select one of the highest priority among PLMN IDs of PLMNs for simultaneously supporting the most slices with the high priority. In step 804, the terminal may use a local configuration as priority policy (a network slice selection policy (NSSP) included in a UE route selection policy (URSP)) or configuration information of the slice to be used by the terminal.

In step 805, if the terminal succeeds in selecting the available PLMN through the process of step 804, it proceeds to step 807 and finishes the process of the PLMN selection. If the terminal does not succeed in selecting the available PLMN through the process of step 804, it proceeds to step 806.

In step 806, the terminal performs the PLMN selection operation by applying normal PLMN selection not considering the slice roaming.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure.

The present disclosure generally relates to a wireless communication system, and more particularly, to an apparatus and a method for supporting slice federation between public land mobile network (PLMN) operators in the wireless communication system.

The invention claimed is:

1. A method performed by an access and mobility management function (AMF) entity in a wireless communication system, the method comprising:
   receiving, from a user equipment (UE), a registration request message;
   transmitting, to a unified data management (UDM) entity, a first message for requesting subscription information for the UE;
   receiving, from the UDM entity, a second message as a response to the first message, wherein the second message includes steering of roaming information including slice roaming information; and
   transmitting, to the UE, a registration accept message as a response to the registration request message, wherein the registration accept message includes the steering of roaming information including the slice roaming information for the UE.

2. The method of claim 1, wherein the first message includes information indicating that the slice roaming information is required for the UE,
   wherein the slice roaming information includes at least one public land mobile network (PLMN) identity for a network slice identity, and
   wherein a PLMN selection is performed based on the slice roaming information.

3. The method of claim 1, wherein the first message is a Nudm_SDM_Get message and the second message is a Nudm_SDM_Get response message.

4. An access and mobility management function (AMF) entity in a wireless communication system, the AMF entity comprising:
   a transceiver; and
   at least one processor coupled with the transceiver and configured to:
      receive, from a user equipment (UE), a registration request message,
      transmit, to a unified data management (UDM) entity, a first message for requesting subscription information for the UE,
      receive, from the UDM entity, a second message as a response to the first message, wherein the second message includes steering of roaming information including slice roaming information, and
      transmit, to the UE, a registration accept message as a response to the registration request message, wherein the registration accept message includes the steering of roaming information including the slice roaming information for the UE.

5. The AMF entity of claim 4, wherein the first message includes information indicating that the slice roaming information is required for the UE,
   wherein the slice roaming information includes at least one public land mobile network (PLMN) identity for a network slice identity, and
   wherein a PLMN selection is performed based on the slice roaming information.

6. The AMF entity of claim 4, wherein the first message is a Nudm_SDM_Get message and the second message is a Nudm_SDM_Get response message.

7. A method performed by a unified data management (UDM) entity in a wireless communication system, the method comprising:
   receiving, from an access and mobility management function (AMF) entity, a first message for requesting subscription information for a user equipment (UE) based on a registration request message from the UE; and
   transmitting, to the AMF entity, a second message as a response to the first message, wherein the second message includes steering of roaming information including slice roaming information for the UE.

8. The method of claim 7, wherein the first message includes information indicating that the slice roaming information is required for the UE,
   wherein the slice roaming information includes at least one public land mobile network (PLMN) identity for a network slice identity, and
   wherein a PLMN selection is performed based on the slice roaming information.

9. The method of claim 7, wherein the first message is a Nudm_SDM_Get message and the second message is a Nudm_SDM_Get response message.

10. A unified data management (UDM) entity in a wireless communication system, the UDM entity comprising:
    a transceiver; and
    at least one processor coupled with the transceiver and configured to:
       receive, from an access and mobility management function (AMF) entity, a first message for requesting subscription information for a user equipment (UE) based on a registration request message from the UE, and
       transmit, to the AMF entity, a second message as a response to the first message, wherein the second message includes steering of roaming information including slice roaming information for the UE.

11. The UDM entity of claim 10, wherein the first message includes information indicating that the slice roaming information is required for the UE,
    wherein the slice roaming information includes at least one public land mobile network (PLMN) identity for a network slice identity, and
    wherein a PLMN selection is performed based on the slice roaming information.

12. The UDM entity of claim 10, wherein the first message is a Nudm_SDM_Get message and the second message is a Nudm_SDM_Get response message.

* * * * *